July 31, 1945.    F. D. GOODLAKE    2,380,749
SPRING WHEEL
Filed March 25, 1943

Frederick D. Goodlake INVENTOR.

BY
Victor J. Evans & Co.
ATTORNEYS

Patented July 31, 1945

2,380,749

UNITED STATES PATENT OFFICE 2,380,749

SPRING WHEEL

Frederick Dean Goodlake, Heth, Ark.

Application March 25, 1943, Serial No. 480,513

1 Claim. (Cl. 152—103)

My invention relates to automotive vehicle wheels, and has among its objects and advantages the provision of an improved spring wheel.

Figure 1:
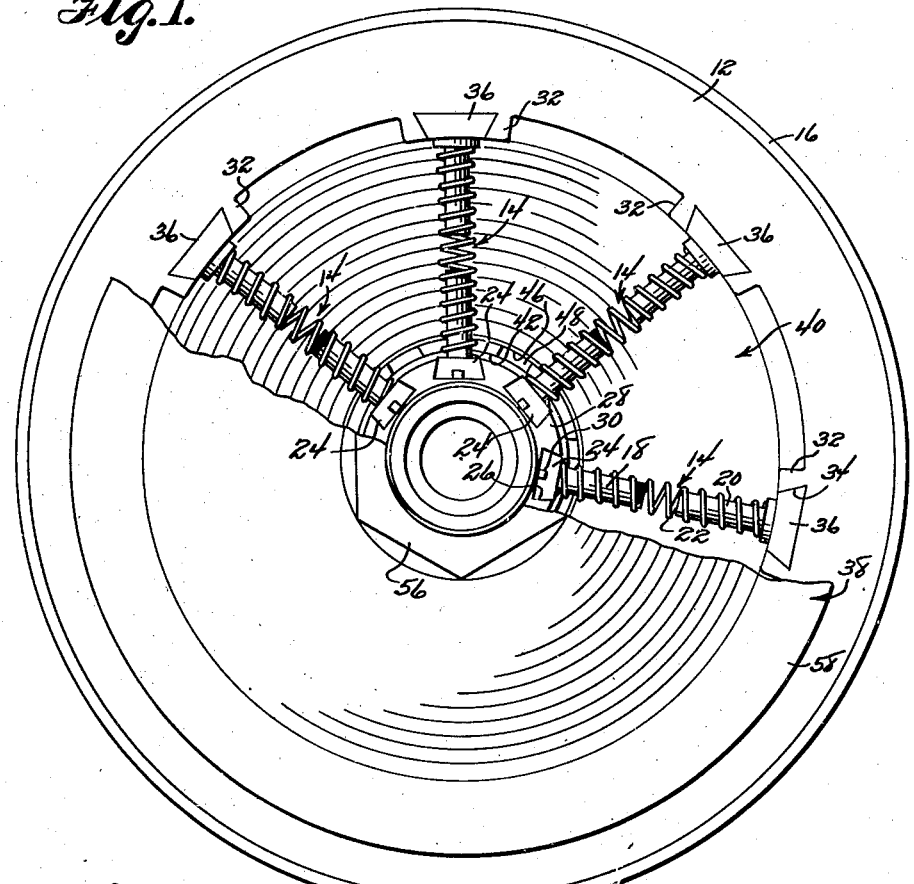
Figure 2:
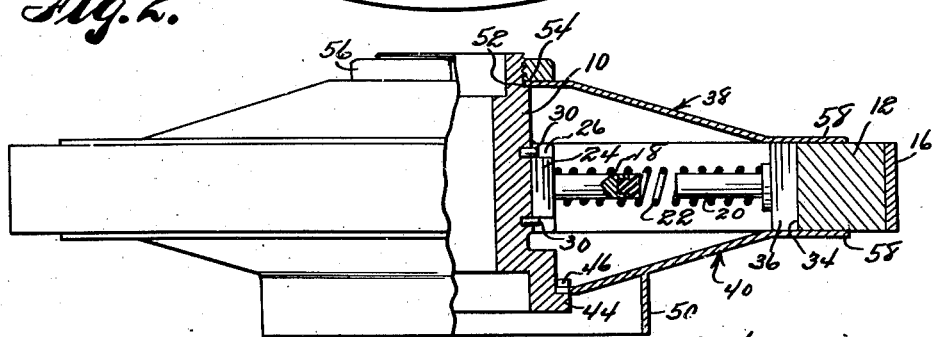

In the accompanying drawing:

Figure 1 is a face view of a wheel partly in section in accordance with my invention, and Figure 2 is an edge view partly in section.

In the embodiment of the invention selected for illustration, I make use of a hub member 10 on which is mounted a rim body 12 through the medium of resilient spokes 14. A tire band 16 of good wear resisting properties is mounted on the body 12. In cases where both the body 12 and the band 16 are of metal, the band may be shrunk on the body.

Each spoke 14 comprises a hub pin 18, a rim pin 20 and a compression spring 22. All the pins 18 have dovetails 24 fitting in dovetail grooves 26 in a flange 28 extending circumferentially of the hub member 10, with the grooves paralleling the axis of rotation of the wheel. Pins 30 are driven into bores in the member 10 at the ends of the dovetails to restrain the dovetails from sliding movement in the grooves. The inner ends of the springs 22 rest on the dovetails 24.

Projections 32 are formed on the inner face of the rim body 12, and each projection is provided with a dovetail groove 34 to receive a dovetail 36 on one of the pins 20. All the dovetails 36 have lengths corresponding to the width of the rim body 12, but the dovetails are restrained from endwise movement in the grooves 34 by two cover plates 38 and 40 bearing against the side faces of the body 12. The plates 38 and 40 coact with the hub and the rim body to provide a housing for the spokes. The outer ends of the springs 22 bear on the dovetails 36, and the pins 18 and 20 are coaxial so long as the body 12 is concentric with the hub 10.

The plate 40 is provided with a central opening 42 to slip over the hub member 10 and lie against a flange 44 at one end of the member 10. Slots 46 are cut in the plate 40 and communicate with the opening 42 to receive lugs 48 on the member 10 to securely fasten this plate against relative rotation on the member 10, since the brake drum, indicated at 50, is fixed to this plate.

A central opening 52 is provide in the plate 38 to receive one end of the member 10, this plate lying against an annular shoulder 54 on the member 10. A nut 56 is threaded on the member 10 to securely clamp the plate 38 against the shoulder 54. Both plates 38 and 40 are of generally conical contour with their base margins bearing against the body 12 so as to embody a strong construction capable of resisting lateral flexing.

While the flat edge margins 58 of the plate 38 and 40 bear firmly against the side faces of the body 12, this body may shift relatively to the edge margins upon yielding of the springs 22. The plates 38 and 40 resist lateral shifting of the body 12, and the spring 22 are of such strength as to resiliently relate the rim body 12 to the hub structure 10. The pins 18 and 20 are spaced sufficiently far apart axially to permit the necessary expansion and contraction of the springs 22, but both sets of pins are sufficiently long to restrain the springs from excessive lateral flexing.

The dovetail connections between the pins 18 and 20 and their respective hub 10 and body 12 provide a construction wherein the spokes 14 are easily and quickly assembled with the hub and the body. These spokes are effectively restrained from relative displacement longitudinally of the hub 10 and also with respect to the rim body 12. Spokes of different load carrying capacities may be easily substituted by merely removing the plate 38 and one set of the pins 30.

Without further elaboration, the foregoing will so fully explain my invention, that others may, by applying current knowledge, readily adapt the same for use under various conditions of service.

I claim:

In a spring wheel having a hub and a rim body disposed circumferentially about the hub, a flange encircling and fixed on the hub, said flange having a plurality of circumferentially spaced dovetail grooves opening through the outer surface and extending axially of the hub, a dovetail member slidably fitted in each of said grooves and terminating short of the ends thereof, said flange having a radial bore opening into said groove adjacent each end of the latter, a pin removably fitted in each bore and projecting outwardly thereof in position to abut each end of the dovetail member for removably holding the latter in fixed position in its groove, a first spoke pin fixed to and extending radially outward of each dovetail member, a complementary second spoke pin extending radially inward from the rim body co-axially with each first spoke pin, said first and second spoke pins having their facing ends spaced apart, and a compression spring coiled about said complementary spoke pins.

FREDERICK DEAN GOODLAKE.